United States Patent [19]

Pensoneau

[11] Patent Number: 5,054,730
[45] Date of Patent: Oct. 8, 1991

[54] PIPE STRUT SYSTEM AND METHOD FOR USING SAME

[75] Inventor: Norman G. Pensoneau, St. Clair County, Ill.

[73] Assignee: Pensoneau Excavating Co., Inc., Belleville, Ill.

[21] Appl. No.: 478,520

[22] Filed: Feb. 12, 1990

[51] Int. Cl.⁵ .............................................. E04G 25/00
[52] U.S. Cl. .................................. 248/231.2; 248/49
[58] Field of Search ..................... 248/231.2, 49, 544

[56] References Cited

U.S. PATENT DOCUMENTS

| | | | |
|---|---|---|---|
| 1,472,992 | 11/1923 | Roeglin . | |
| 2,714,498 | 8/1955 | Wuthrich | 248/354 |
| 2,741,821 | 4/1956 | Findley | 25/118 |
| 3,083,795 | 4/1963 | Land | 189/34 |
| 3,700,202 | 10/1972 | Donnels | 248/354 |
| 3,810,364 | 5/1974 | Johnson | 248/49 |
| 3,880,394 | 4/1975 | Wisecarve | 248/354 |
| 3,948,475 | 4/1976 | Jones | 248/231.2 |
| 4,122,645 | 10/1978 | Tooley | 52/648 |
| 4,234,151 | 11/1980 | John et al. | 248/354 |
| 4,741,505 | 5/1988 | Anderson | 248/357 |

Primary Examiner—Robert L. Wolfe
Attorney, Agent, or Firm—Kalish & Gilster

[57] ABSTRACT

A pipe support strut system uses struts, each having a rigid sighting member having threaded shafts extending opposingly therefrom. Each shaft is provided with a correspondingly threaded nut having steel rod handles. A pipe extends coaxially around and outward from each threaded shaft and abuts the nut threaded thereon. The pipe terminates outwardly in a base plate having flanges for retaining a wooden block or pad against the internal wall of a large-diameter, flexible pipe prior to burial thereof.

18 Claims, 2 Drawing Sheets

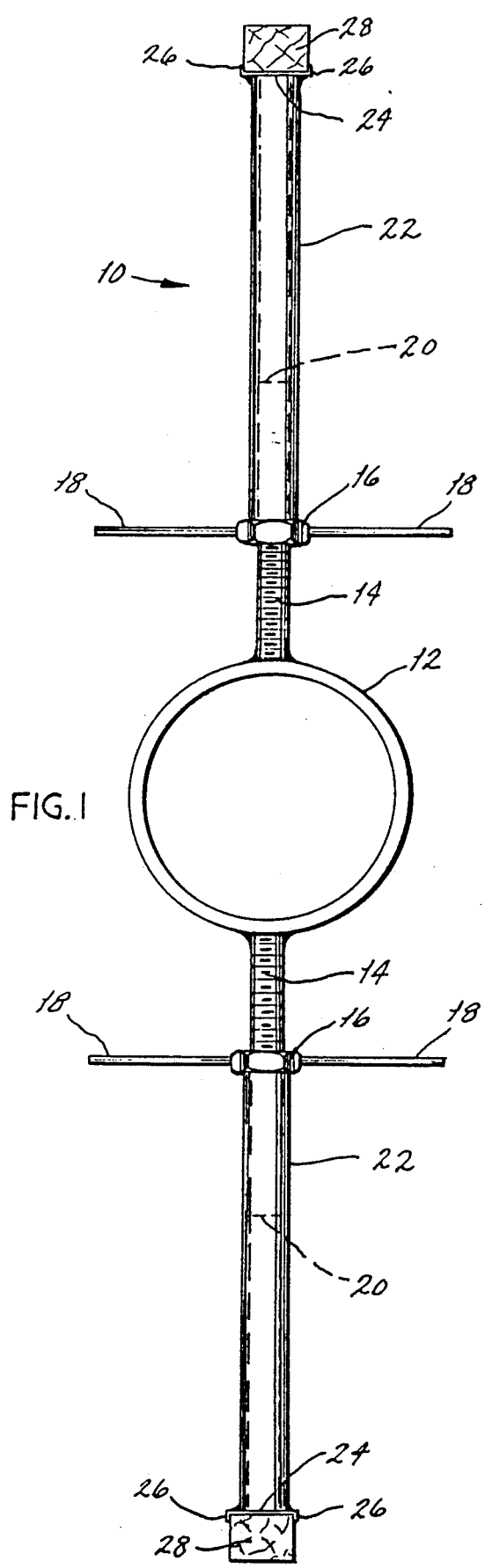
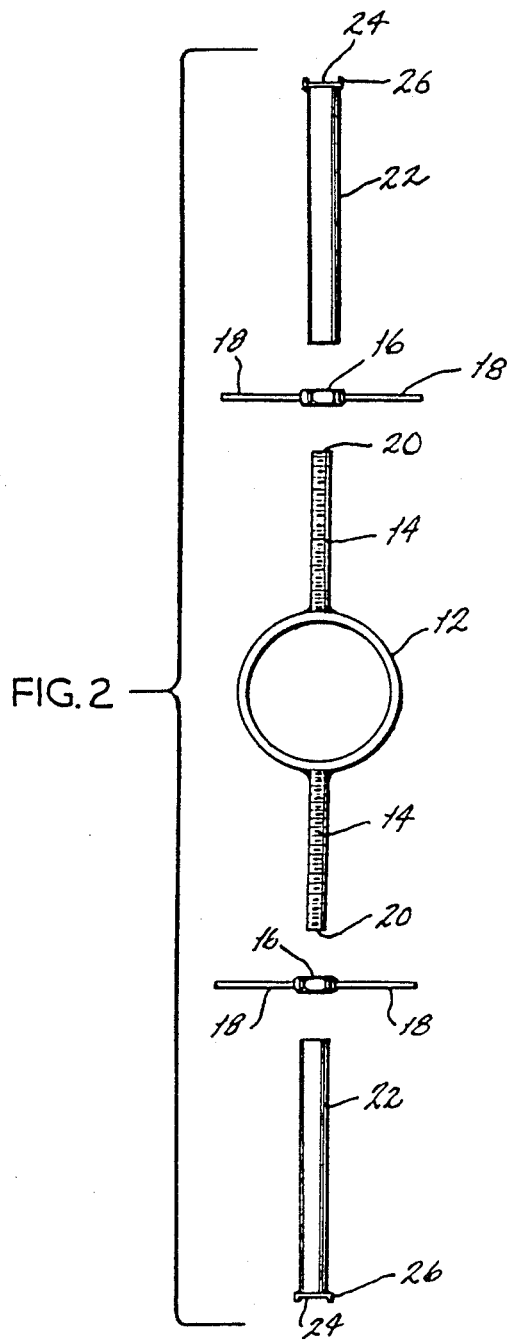
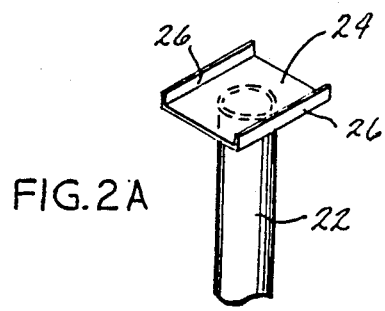

PIPE STRUT SYSTEM AND METHOD FOR USING SAME

BACKGROUND AND SUMMARY OF THE INVENTION

This invention relates generally to the field of pipe support apparatuses and, more particularly, to a novel pipe strut adapted to temporarily internally support a large, flexible pipe and permit accurate alignment thereof.

Heretofore, various types of support devices have been known in the construction industry. For example, there exist braces which have two threaded members and a centered rotatable adjusting member. Illustrations of this are seen in U.S. Pat. No. 3,083,795 to Land, U.S. Pat. No. 2,741,821 to Findley, and U.S. Pat. No. 1,472,992 to Roeglin.

The Land patent discloses a building wall and method of constructing it. The method requires the use of a tubular support element having threaded extensions attached to plugs at the outer ends of the tubular support. The ends press fit into the tubular element 4. Rotation of the tubular element relative to the ends, or extensions 7, 8 elongates the support element or decreases its length, depending upon the direction of rotation. Thus, the support element may be made to accommodate various ceiling heights. The ends of the Land support device are fitted into shoes which are associated with channels within the wall to be formed. The disclosed supporting structures are left in place within the newly constructed wall.

Findley discloses a brace for supporting poured concrete forms. The brace comprises threaded rods attached pivotally at one end to plates which attach to the ground or to a board. The other ends of the rods each are threadably connected to a turn-buckle 32. Rotation of turn-buckle 32 allows the brace to be adjusted so that the form is in the desired position, usually vertical.

Roeglin shows a builder's tool for supporting a wall, the tool having two rods which each attach threadably to a turn-buckle having a handle 7. Rotation of the turn-buckle adjusts the rods until a timber attached by jaws to the opposite end of one rod is plumb.

In contrast to the Land, Findley and Roeglin devices, the present invention carries two threaded rods opposed to each other and connected by a central element which is not the adjusting member. Rather, the new strut system components are adjusted by manipulation of a steel rod handle and connected nut, rotation of which permits coaxial longitudinal positioning of an exterior pipe relative to a corresponding threaded rod.

Additionally, U.S. Pat. No. 3,700,202 to Donnels discloses an adjustable brace which fulfills the same function as the above-described invention of Roeglin. However, the Donnels brace is comprised of pipes rather than rods, the pipes being telescoping in nature and having hinges rather than clamps attaching to planks. The adjustment means for the Donnels device is removable. It includes a friction-locking member having a brake shoe and a backing plate and a threaded bar with two threaded sections, one having right-handed and the other having left-handed threads. After adjusting the Donnels strut to the proper position, the adjustment member or assembly can then be transferred and used to adjust another strut while the first strut remains in place.

U.S. Pat. No. 3,880,394 to Wisecarver, U.S. Pat. No. 2,714,498 to Wuthrich, U.S. Pat. No. 4,122,645 to Tooley, U.S. Pat. No. 4,234,151 to John et al., and U.S. Pat. No. 4,741,505 to Anderson all disclose props or support devices which comprise essentially two members, one being tubular and straight, the other being a threaded pipe for passing within or outside of the tubular straight member. Various means are disclosed in each of the above-mentioned patents for stabilizing the device in a preselected position.

None of the above-cited patents disclose a brace for use within a large pipe, such as a sewer pipe, which is to be buried. Nor do the above patents disclose an adjustable, reusable pipe support strut which further functions within a system of such struts as an alignment device.

Heretofore, when large subterranean pipe, such as is used for sanitary sewers, slurry lines or other industrial type piping were installed, there existed the problem of the pipes collapsing in the installment trench when the pipe was covered with earth or other material. Collapsed or buckled pipes resulted in the project sometimes not meeting standards or local ordinances for pipe volume. This problem has sometimes been conventionally addressed by having a person enter the pipe and insert crossbeams constructed of two by four inch boards. After the piping was safely covered with dirt or other material someone would then have to enter the pipe and remove the constructed braces. These procedures required the use of a great deal of time, effort and materials. A certain amount of training was necessary in order to properly install the supports within the pipe. Furthermore, the removal of the braces by use of hammers, hatchets or chain saws could be very hazardous to the operator because of the limited light and space in the pipe.

Construction projects involving large buried pipe often are required to meet certain specifications as to angle of the grade of the pipe or volume of pipe flow-through. Problems often occurred in aligning sections of pipe so that the ends would properly join and not be subject to shifting and separation, buckling, or even bulging out through the surface of the ground when subjected to forces either internal or external to the pipe. For example, if a pipe were installed so that the joint between two sections was not formed properly, a great deal of hydrostatic pressure formed on the inside of the pipe would cause the joint to rupture. Use of flexible piping, such as high-density polyethylene, is of some aid in meeting grade or angle requirements, however, such pipe is still subject to collapse or bursting of the pipe joints when the pipe trench is filled in or excessive pressure otherwise occurs. Furthermore, requirements often exist for large subterranean pipes to be installed such that when observed from one end a certain percentage, e.g. 90 percent, of the opening of the far end of the pipe is visible. If the pipe is installed at the wrong angle, or becomes even partially collapsed, such standards may not be met.

Therefore, it is among the objects of the present invention to provide a pipe strut support system for use in large flexible pipe to prevent such pipe from collapsing as it is buried within a trench or ditch. In addition to providing support for the pipe, the new pipe support struts are intended to be adapted for easy and accurate alignment of consecutive sections of the pipe. For purposes of economy, it is intended that each of the new struts of the system have few and simple parts and be capable of easy and quick assembly and disassembly by one person with little or no training. Furthermore, it is intended that assembly and disassembly of the new struts require no tools and that use of the new strut devices as a system permit pipe alignment with only the added requirement of a device for producing a collimated light beam such as a laser beam. It is also intended that the new pipe support strut have ends adapted for stable positioning within the pipe while simultaneously permitting rapid optional adjustment.

Thus, it is intended that the new pipe strut system provide a safe, inexpensive and facile manner of facilitating installation of subterranean piping in compliance with local ordinances or other regulations imposed because of the incline that the pipe must follow.

Therefore, in furtherance of these objects, the new pipe support strut comprises briefly a strut device for use within flexible pipe to be buried. The strut device comprises a central member sized for extending interiorly of the flexible pipe. At least first and second adjusting means have outer ends and spacedly extend from the central member. A base member is respectively carried at the outer end of each adjusting means for contacting spaced surface portions of an inner wall of the flexible pipe for providing strutted support between said spaced pipe surface portions. The adjusting means are each selectively adjustable relative to the central member for selectively varying the overall dimension of the strut device between the spaced pipe surface portions and for selectively establishing the position of the central member within the flexible pipe. The central member includes sighting means for sighting along a plurality of such strut devices whereby to permit sighted alignment of the flexible pipe before burial thereof.

Other objects and features will be in part apparent and in part pointed out hereinbelow.

BRIEF DESCRIPTION OF THE DRAWINGS

FIG. 1 is an elevational view of a pipe strut device constructed in accordance and embodying the present invention.

FIG. 2 is an exploded view of the pipe strut device of FIG. 1.

FIG. 2A is a partial perspective view of one end of the pipe strut of FIG. 2.

DESCRIPTION OF THE PREFERRED EMBODIMENT

Figure 3:
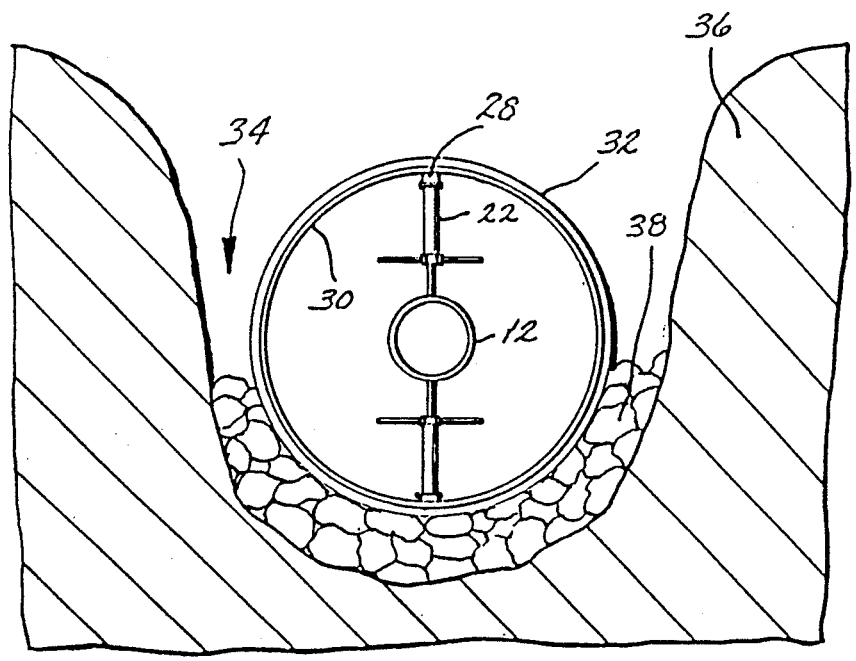
FIG. 3 is an end elevational view taken on line 3—3 of FIG. 4 of the pipe strut of FIG. 1 positioned within an entrenched pipe.

Referring now by reference characters to the Figures, 10 generally designates a pipe strut device constructed in accordance with and embodying the present invention. Strut device 10 comprises a sighting ring 12 which is preferably circular and composed of 12 inch steel casing having a half inch wall. Extending opposingly outward from sighting ring 12 and in the plane formed thereby are opposing, righthand threaded shafts 14. Although only two such shafts 14 are preferred, a larger number, such as three or four evenly spaced about ring 12 could be utilized. Along each threaded shaft 14 is positioned a correspondingly threaded nut 16 from which laterally extend preferably opposing one-half inch by six inch steel rods 18, as handles. Extending outwardly from and coaxial to each outer end 20 of threaded shafts 14 and abutting each nut 16 is a preferably metal elongated pipe 22 which terminates in a base plate 24 (FIG. 2A) preferably having outwardly extending opposed flanges 26. Base plate 24 may abut and flanges 26 be positioned to flank a wooden block 28 placed as a cushion or spacer between base plate 24 and the inner wall 30 of pipe 32 (shown schematically in FIGS. 3 and 5).

Figure 4:
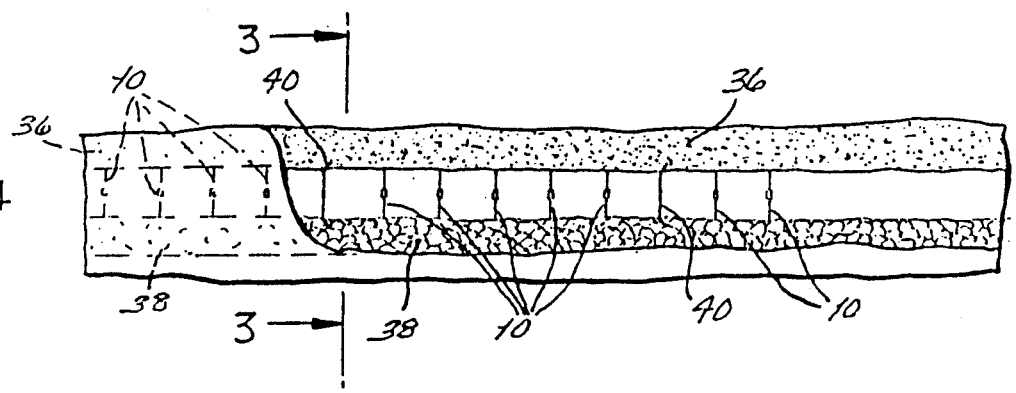
FIG. 4 is a side sectional view of the trench of FIG. 3 having multiple pipe struts as in FIG. 1 positioned as a system therein.
Figure 5:
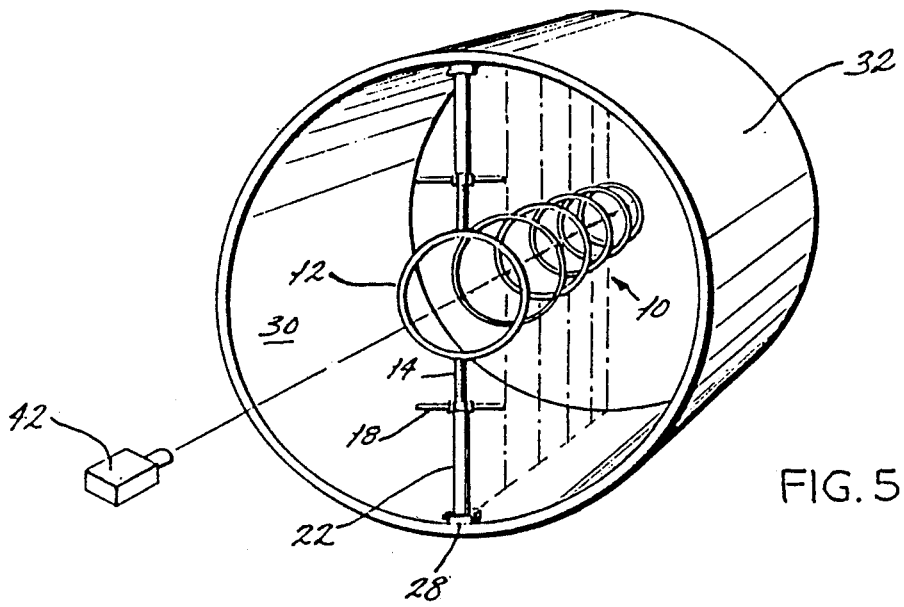
FIG. 5 is a perspective view of the pipe strut of FIG. 1 positioned within a pipe and having other such struts shown in phantom, positioned as for alignment of such pipe.

The use of strut device 10 is illustrated in FIGS. 3 through 5. When a pipe 32, for example a sewer pipe formed of high density polyethylene, is installed, customarily a trench 34 is dug in the ground 36 and provided with a shallow layer of base material 38, such as coarse gravel, prior to placing pipe 32 therein. Such pipes 32 commonly have interlocking bell-shaped ends 40 (shown schematically in FIG. 4, not shown in FIG. 5) for connecting subsequent sections, approximately 20 to 30 feet each, of pipe 32 (FIG. 4). Pipe ends 40, regardless of the shape thereof, must be properly connected in order to withstand internal hydrostatic pressure which may develop and/or external pressures resulting from embedment material (not shown), such as coarse sand, that may be filled into trench 34 over pipe 32 or, for example, from traffic above the area of buried pipe 32. If consecutive sections of pipe 32 are not properly aligned, ends 40 will not be securely connected, and may separate with potentially disastrous results. If pipe 32 is not internally supported during the filling of trench 34 it is subject to collapse under pressure resulting from the embedment material shoveled or dumped upon pipe 32. Such collapse is likely to cause decreased pipe flow and/or displacement or distortion of ends 40 such that the same do not correctly meet and connect.

In addition to the problem of potential collapse of pipe 32, pipe construction projects usually must comply with local ordinances or other regulations regarding grade or curve of the pipe 32 to be laid within trench 34. While accommodating the terrain, pipe 32 must also be laid in such manner that ends 40 meet properly and that a specified percentage of the cross section of pipe 32 be visible when viewed from one end thereof.

The new strut system addresses each of the above problems as hereafter described. In sewer systems, or other construction projects requiring pipes 32 of at least 48 inches in diameter, once sections of pipe 32 have been consecutively laid in trench 34 such that the ends 40 of each section meet correctly, a person (not shown) may enter pipe 32 with one or more disassembled strut devices 10 for placement at intervals, such as every 6 or 7 feet, along the interior of pipe 32. In such use as a system, each strut 10 will usually be placed vertically such that base plates 26 press outwardly against inner wall 30 to resist the force exerted by embedment material added to trench 34. As stated previously, a block or pad 28 such as a three by two by four inch piece of wood may optionally be used as a cushion between base plate 26 and inner wall 30 to protect wall 30 from puncture.

If the environmental conditions require, strut device 10 may be placed at a vertical angle other than 90 degrees relative to the horizon. Strut device 10 is preferably positioned such that the plane of sighting ring 12 is substantially perpendicular to inner wall 30. By turning handles 18 which are rigidly affixed to nut 16, nut 16 may be adjusted threadably along the length of threaded shaft 14. Thus elongated pipe 22 which abuts nut 16 may be moved coaxially along threaded shaft 14 toward or away from sighting ring 12 as necessary for base plate 26 or block 28 to firmly contact inner wall 30.

After a number of strut devices 10 have been so installed it can be determined whether pipe 32 is properly positioned along its intended path by sighting through the respective sighting rings 12. This is most easily accomplished by use of a device 42 for producing a beam, such as a laser beam 44 (FIG. 5) and aiming the beam 44 through sighting rings 12. If it is determined that pipe 32 is misaligned, it may be repositioned by a slight manual shifting thereof and bracing within the trench by use of, for example gravel or mechanical means prior to filling trench 34 with embedment material.

After pipe 32, having numerous strut devices 10 therein, has been buried within trench 34 a person may simply enter an open end of pipe 32 and by turning handle(s) 18 release strut device 10 from its position within pipe 32. Nuts 16 will remain attached to threaded shafts 14 and each support pipe 22 will simply slip off end 20 of corresponding threaded shaft 14. Thus the worker can merely slip sighting rings 12 over his or her forearm, leaving the hands free to carry support pipes 22 and, if necessary, blocks 28. This facile method of strut 10 removal requires no tools whatsoever, thus it is fast and safe for the worker and ensures that pipe 32 will not be damaged by a carelessly aimed tool during removal of strut device 10. Accordingly, after a section of pipe 32 is properly laid the strut devices 10 therein may be quickly removed and reused in another section of pipe 32; the previously embedded section of pipe 32 then being supported externally by the embedment material itself.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A strut device for use within flexible pipe to be buried, the strut device comprising a central member sized for extending interiorly of the flexible pipe, at least first and second adjusting means having outer ends and spacedly extending from the central member, a base member respectively carried at the outer end of each adjusting means for contacting spaced surface portions of an inner wall of the flexible pipe for providing strutted support between said spaced pipe surface portions, the adjusting means each being selectively adjustable relative to the central member for selectively varying the overall dimension of the strut device between the spaced pipe surface portions and for selectively establishing the position of the central member within the flexible pipe, the central member including sighting means for sighting along a plurality of such strut devices whereby to permit sighted alignment of the flexible pipe before burial thereof.

2. The strut device of claim 1 wherein the central member comprises at least first and second elongated members spacedly extending from and being coplanar with the sighting means for permitting collinear adjustable attachment of the sighting means to the adjusting means, and further wherein the adjustment means are adapted for collinear adjustable attachment to the corresponding elongated members.

3. The strut device of claim 2 wherein the elongated members comprise threaded rods fixed to the sighting means and the adjusting means comprise correspondingly threaded portions for permitting rotatable coaxial linearly adjustable attachment to the respective threaded rods.

4. The strut device of claim 3 wherein the correspondingly threaded portions of the adjustment means comprise threaded nuts and the adjusting means further comprise elongated members contacting the threaded nuts for being coaxially adjustable relative to the elongated members.

5. The strut device of claim 4 wherein laterally extending rods are fixed to the threaded nuts for providing handles for turning the corresponding nuts.

6. The strut device of claim 2 wherein the sighting means comprises a circular portion for facilitating sighted alignment of the flexible pipe.

7. The strut device of claim 1 wherein the strut device is comprised of metal.

8. A device for temporarily, internally supporting a flexible pipe to be buried and having an inner wall, the device comprising a central portion for providing a means for alignment of the flexible pipe, at least first and second opposing extensions fixed to and extending outwardly from and coplanar with the central portion, at least first and second cooperative members adjustably connected respectively to the at least first and second extensions, at least first and second elongated members extending outwardly from said extensions respectively, abutting the first and second cooperative members; and terminating respectively in at least first and second base members for contacting the inner wall of the pipe.

9. The strut device of claim 8 wherein the cooperative members comprise threaded nuts and the opposing extensions comprise correspondingly threaded shafts for rotatable colinear adjusting connection therebetween 10. The strut device of claim 9 wherein the elongated members comprise pipe members coaxial with and having a greater diameter than the threaded shafts.

11. The strut device of claim 9 wherein the threaded nuts comprise laterally extending rods for providing handles for turning the corresponding nuts.

12. The strut device of claim 8 wherein the base members comprise rectangular plates connected substantially perpendicularly to a longitudinal axis of the strut device.

13. The strut device of claim 8 wherein the strut device is comprised of metal.

14. The process of installing a large-diameter, flexible, subterranean pipe; the process comprising the steps of:

digging a trench having a depth and width greater than the diameter of the pipe to be buried,
placing a preselected length of the pipe longitudinally within the trench,
substantially vertically positioning a strut device within the pipe, adjusting the length of the strut device until a portion thereof is of such length that ends of the strut device firmly contact the inner wall of the pipe, repeating the steps of substantially vertically positioning a strut device and adjusting the length thereof at intervals along the length of the pipe, filling the trench around and over the pipe with embedment material, releasing each strut device by readjusting the length thereof until it is substantially less than the internal diameter of the pipe, removing the strut device from the pipe, and repeating the above steps with another preselected length of the pipe.

15. The process of claim 14 and further comprising layering the bottom of the trench with coarse material for providing a firm bed for the pipe in the trench.

16. The process of claim 14 and further comprising placing a spacer between each end of the strut system and the pipe inner wall prior to rotating at least one portion of the strut device.

17. The process of claim 14 and further comprising providing a collimated light beam and sighting the collimated light beam along sighting means of each of the strut devices prior to removal thereof for aligning the preselected length of pipe.

18. The process of claim 17 wherein the step of providing a collimated light beam comprises using a laser light source, and the step of sighting comprises aiming said laser light source through a central sighting portion of each of the strut devices.

* * * * *